J. P. LIND.
VEHICLE LOCK.
APPLICATION FILED OCT. 17, 1919.
1,337,709.
Patented Apr. 20, 1920.
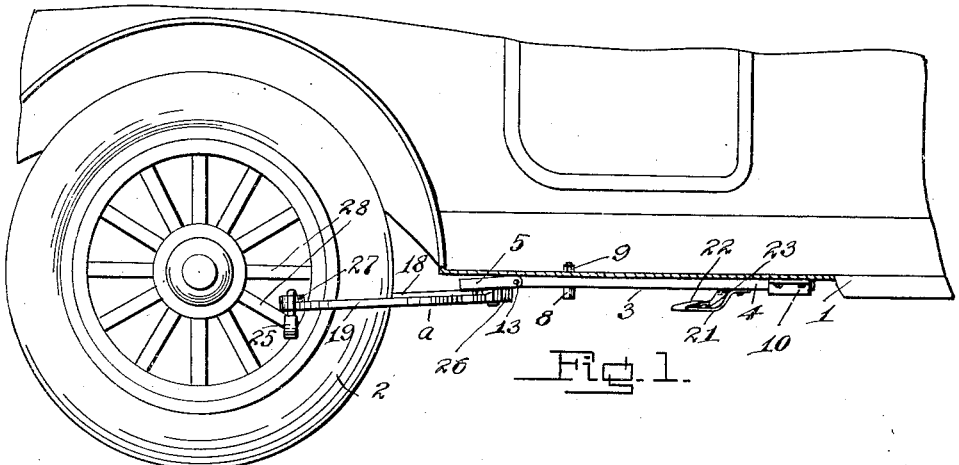
Fig. 1.
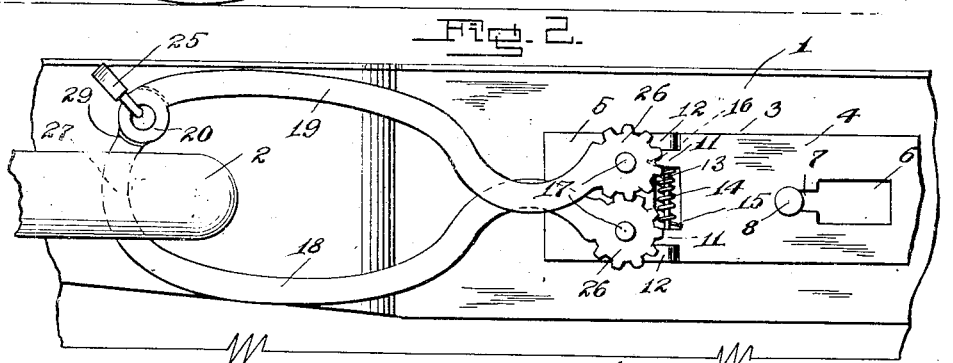
Fig. 2.
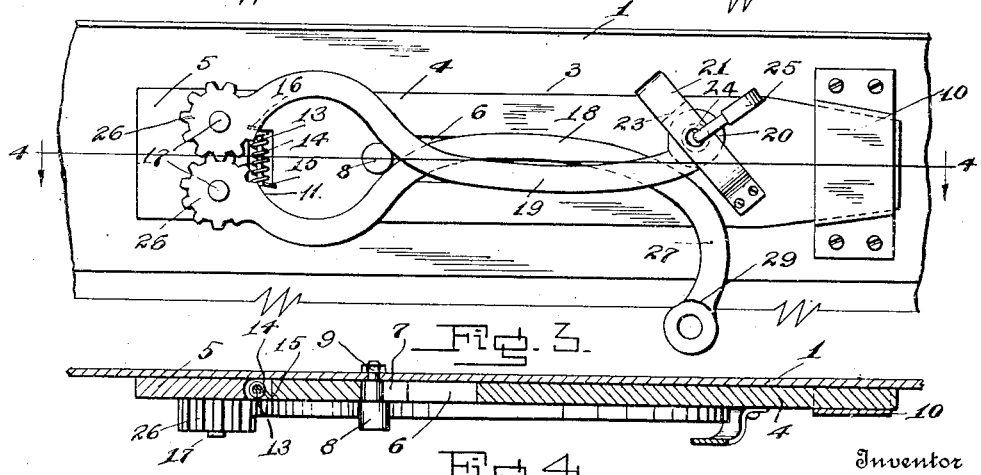
Fig. 3.
Fig. 4.
Witness
A. Dundell
Inventor
Jacob P. Lind
By
C. C. Shepherd
Attorney

UNITED STATES PATENT OFFICE.

JACOB P. LIND, OF COLUMBUS, OHIO.

VEHICLE-LOCK.

1,337,709.  Specification of Letters Patent.  Patented Apr. 20, 1920.

Application filed October 17, 1919. Serial No. 331,267.

*To all whom it may concern:*

Be it known that I, JACOB P. LIND, a citizen of the United States, residing at Columbus, in the county of Franklin and State of Ohio, have invented certain new and useful Improvements in Vehicle-Locks, of which the following is a specification.

This invention relates particularly to improved locking mechanism adapted for use in conjunction with motor vehicles, and has for its primary object to provide simple and efficient mechanism of this character which may be conveniently carried by a vehicle and will serve to lock the latter against unauthorized use in a positive and secure manner.

Another object of the invention resides in a lock for the purpose stated which is adapted to be mounted upon the underside of a vehicle running board, said lock including a pair of pivotally mounted arms which are capable of being so fulcrumed that the same will surround the rim of a wheel between the spokes of the latter, means being provided in conjunction with said arms to securely retain the same in their locked relationship with the wheel and in this manner to prevent rotation of the latter or at least to prevent successful operation of the vehicle.

Other objects of the invention reside in providing the locking arm of intermeshing gear elements which serve to insure simultaneous movement of both of said arms upon positive actuation of one or the other thereof; in mounting said arms upon a plate or base which is detachably connected with the running board in order that when it is necessary to move the vehicle when the latter is locked by said arms, said plate may be released from engagement with the running board to permit of limited movement on the part of the vehicle, said plate being of such construction as to prevent successful use of the vehicle either when the plate is detached; in providing spring means in connection with said plate to retain the latter in firm engagement with the under side of a running board, whereby looseness and rattle between parts will be accordingly obviated, and in providing latch means for retaining the arms, when out of use, in a folded position beneath said running board, in order that the locking mechanism when not in service will be out of sight and not capable of offering awkward and objectionable appearance.

With these and other objects in view, as will appear as the description proceeds, the invention accordingly consists in the novel features of construction, combination of elements and arrangement of parts, hereinafter to be fully described and to have the scope thereof pointed out in the appended claims.

In the accompanying drawing, forming a part of this specification, and in which similar characters of reference denote like and corresponding parts:

Figure 1 is a fragmentary side elevation of a motor vehicle, and illustrating the application of the locking mechanism comprising the present invention thereto, Fig. 2 is a bottom plan view of the locking mechanism, the parts being shown in locked relationship with a vehicle wheel, Fig. 3 is a similar view showing the parts in their folded or collapsed positions, and Fig. 4 is a longitudinal vertical sectional view, the plane of which being disclosed by the line 4—4 of Fig. 3.

Referring more particularly to the structural details of the preferred form of the invention use is made of a vehicle locking mechanism which is designated in its entirety by the reference letter $a$. This mechanism, as shown, is preferably mounted on the underside of the running board 1 of a motor vehicle and is arranged in close proximity to one of the driving wheels 2 of said vehicle. To provide a mounting for the locking mechanism, use is made of a base member 3, which is preferably formed from metal and provides a main elongated section 4 and a relatively short pivoted section 5. To support the base member in its applied position to the underside of the running board, the main section 4 is provided with a slot 6, which terminates in a reduced portion 7, the latter being of a size to receive the shank 8 of a head stud 9, whereby the weight of the member 3 may be received partially by the enlarged head of said stud. It will be apparent, however, that by sliding the base member 3 rearwardly, or toward the wheel 2, the stud 9 will be so positioned as to lie within the enlarged portion of the slot 6 so that the base member as a whole may be removed from engagement with the running board. In conjunction with the stud 9, the base member 3 is supported by means of a main supporting bracket 10, which is so formed as to receive the forward end of said base member when the stud 9 is positioned within the reduced portion 7 of the slot, however, by sliding the base member rearwardly it is obvious that the same may be disengaged from both the stud 9 and the bracket 10.

In order to prevent the base member from rattling or from becoming accidentally disengaged from its supporting elements, the rear end of the main section 4 is provided with a pair of apertured ears 11, which are arranged so as to coöperate with similar ears 12 provided upon the forward edge of the pivoted section 5, a pin 13 being disposed so as to extend through the apertures in said ears and in this manner will serve to pivotally connect the section 5 with the main section 4. A spring 14 is positioned about the pin 13 and is preferably mounted so as to extend between the ears 11, and one extremity 15 of said spring is securely connected with or mounted in the main section 4, while the opposite extremity 16 is embedded within the pivoted section 5. Obviously, by use of this spring hinge structure it will be necessary to place the spring 14 under tension in order to aline the sections 4 and 5 so that when thus positioned the normal tendency of said spring will be to force the sections downward, or away from the running board. By virtue of this friction, it will be manifest that the base member will be securely retained in engagement with the running board so that undue looseness or rattling between parts will be overcome. The section 5 is provided with a pair of stud shafts 17 which project vertically in a downward direction therefrom, and journaled about these shafts is a pair of curvilineal locking jaws or arms 18 and 19. These arms are adapted to assume folded or collapsed positions when not in use and, as shown in Fig. 3, when thus positioned the same will lie immediately under the base member 3 so as to be out of the way and to prevent the same from being exteriorly viewed. To retain the jaws in their collapsed positions, the short jaw 19 is provided with a circular apertured extremity 20, which is designed, so that when collapsed the same will spring under a spring actuated latch member 21, carried by the section 4. This latch member may be formed from resilient sheet metal and is provided with a beveled nose portion 22, which terminates in a locking shoulder 23, whereby when the jaw 19 is swung inwardly, the same will pass under the nose portion 22 and will elevate the latch member 21 until the extremity 20 passes said nose portion. When this operation is completed, the nose portion 22 by being released will respond to its inherent resiliency, so that the shoulder 23 will be brought into locking engagement with the extremity 20, thus preventing movement on the part of either of said jaws. The latch member 21 may be apertured as at 24 so that the latter will aline with the aperture formed in the extremity 20. Then, by means of a padlock 25 the latter may be inserted through the apertures in said extremity and latch member and locked in position so as to further prevent unauthorized tampering with the locking mechanism.

The pivoting extremities 26 of the locking jaws are of gear shaped formation and are provided with intermeshing teeth, hence it will be obvious that the positive actuation of either one or the other of the locking jaws or ears will insure simultaneous operation in unison on the part of the other. By virtue of this construction it will be evident that the locking of the jaw 19 to the latch member 21, by means of the lock 25 will also serve to lock the longer arm 18 against movement. When in their collapsed positions, the jaws are so formed as to overlap each other, or in other words the jaw 19 will underlie the jaw 18. Also, when thus situated said jaws will engage with the head stud 9, so that movement of the base member rearwardly in an effort to release the same from the running board will be precluded.

From the foregoing, it will be obvious that to effect the locking of the wheel 2, it is simply necessary to rotate the jaws 18 and 19 rearwardly. When this is accomplished the jaws are of such form that the longer jaw 18 will have its extremity 27 positioned between the spokes 28 of the wheel 2, and said jaw will terminate at a position to the side of the wheel 2, owing to the fact that the same is of greater length than the jaw 19. The latter is of sufficient length so that its extremity 20 will engage with the extremity 27 in the manner shown in Fig. 2, whereby a padlock, or other equivalent locking mechanism, may be inserted through the openings of said extremities to lock the jaws against movement. Accordingly, by being positioned between the spokes 28, the rotation of the wheel 2 will be prevented. It will of course be obvious that the same padlock may be employed for locking the extremities 20 and 27, as is employed in locking the jaw 19 to the latch member 21. By rendering the jaws of different lengths, the same when extended will terminate to the front of the wheel 2 and will not terminate inwardly of the latter. This feature of construction tends to facilitate the locking of said jaws when the latter are extended. Shoulders 29 may be formed on the extremities of said jaws for the purpose of effecting accurate registration of the extremities 20 and 27 when the jaws are extended. Moreover, by pivoting the section 5, it is possible to oscillate the arms or jaws when the latter are extended, hence if one of the spokes 28 should be so positioned as to interfere with the swinging movement of said arms, the latter may be oscillated with the pin 13 as a center, in such manner that the jaws will clear the intervening spoke. This construction eliminates the necessity of rotating the wheel so as to permit of the fastening together of the jaw extremities. In the event of it becoming necessary to move the vehicle, when the latter is locked by the locking mechanism *a*, for example, in the event of fire or for traffic reasons, said machine may be moved for a limited distance by rotating the wheel 2 even when the latter is locked. This has the result of disengaging the base member from its supporting elements and permits the same to drop to the ground. It will be apparent that this release will permit the vehicle to be moved a slight distance, but owing to the impediment offered by the base member, it will be absolutely impossible to effect the successful operation or use of the machine.

From the foregoing description, taken in connection with the accompanying drawing, it will be apparent that locking mechaanism has been provided which may be quickly and easily connected with standard forms of motor vehicles, and one which will tend to provide a positive and durable lock for the purpose of minimizing thefts of such vehicles. I do not claim to be the original inventor of the broad idea of locking a vehicle by means of pivoted arms or jaws attached to the running board of an automobile, but on the contrary have merely provided means which are believed to constitute a distinct improvement upon such prior devices, and these improvements will clearly be apparent upon perusal of the above and have been particularly pointed out in the following claims.

What I claim is:

1. A lock for motor vehicles comprising a base member, means for securing said base member to the under side of a running board of a motor vehicle, a pivoted section carried by said base member, jaws pivotally carried by said section and arranged when in an inactive position to underlie said base member, and when in an active position to surround the driving wheel of a motor vehicle, and means whereby said jaws may be simultaneously operated.

2. A vehicle lock comprising a base member, means for securing said base member to the underside of the running board of a motor vehicle, a section hinged to said base member, locking jaws pivotally carried by said section, intermeshing gear means coöperative with said jaws to permit of their simultaneous operation, said jaws being of such construction as to embrace the driving wheel of said vehicle when in an extended position and when in an inactive position to lie beneath said running board, and latch means for retaining said jaws in their inactive positions.

3. A vehicle lock comprising a base member, means for detachably securing said base member to the underside of a vehicle running board including a head stud operating in a slot formed in said base member and a coöperative bracket, a pair of locking arms pivotally carried by said base member and capable of being oscillated on a horizontal plane so as to be brought into or out of engagement with a driving wheel, and means whereby said arms may be vertically oscillated.

In testimony whereof I affix my signature.

JACOB P. LIND.